A. P. Torrence,
Felling Trees.

No. 26,385.           Patented Dec. 6, 1859.

Witnesses:
A. M. Edelleman
J. A. Smith

Inventor:
A. P. Torrence

UNITED STATES PATENT OFFICE.

A. P. TORRENCE, OF OXFORD, GEORGIA.

MACHINE FOR GIRDLING AND FELLING TREES.

Specification of Letters Patent No. 26,385, dated December 6, 1859.

*To all whom it may concern:*

Be it known that I, A. P. TORRENCE, of Oxford, in the county of Newton and State of Georgia, have invented a new and Improved Device for Felling and Girdling Trees; and I do hereby declare that the following is a full, clear, and exact description of the same, reference being had to the annexed drawings, making a part of this specification, in which—

Figure 1:
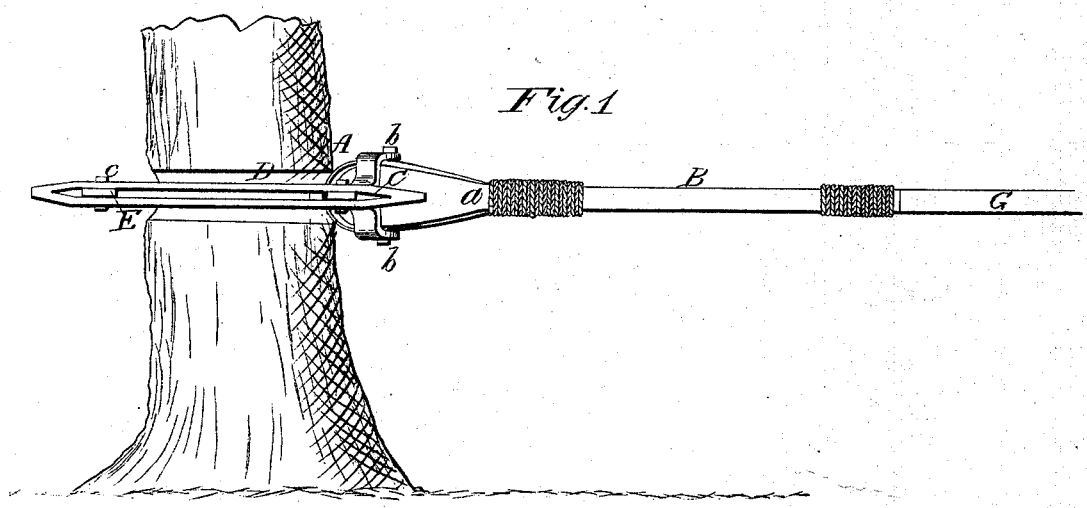
Figure 2:
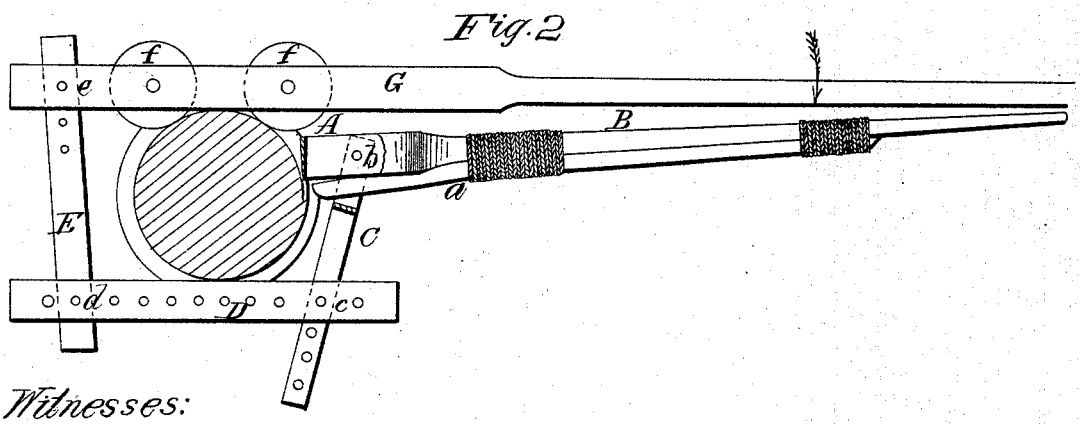

Figure 1, is a side view of my invention applied to its work. Fig. 2, is a plan or top view of ditto.

Similar letters of reference indicate corresponding parts in the two figures.

The object of this invention is to obtain a simple and efficient device for felling and girdling trees, one that may be readily applied to its work, operated with facility and constructed at a moderate cost.

The invention consists in attaching a cutter to a proper handle and connecting said cutter and handle to a draft lever in such a way that when the implement is applied to its work, the necessary power applied to the draft lever and the cutter handle properly manipulated by the operator, the cutter will be moved around the tree and cut the same circumferentially and toward its center.

To enable those skilled in the art to fully understand and construct my invention I will proceed to describe it.

A, represents a cutter which is of gouge-form and attached to a handle B, to the front side of the handle B, a bar a, is attached the inner end of said bar being wider than its other portion in order to conform to the width of the cutter and form a gage for the same, the gage by adjusting the bar a, on the handle B, exposing more or less of the edge of the cutter and thereby determining the depth of the cut which may be graduated according to the power applied to the device.

To the cutter A, a bar C, is attached by points b, b, said bar being allowed to work freely on its points. The bar C, is perforated with holes at equal distances apart and passes through a slotted perforated bar D, which is also perforated, the two bars C, D, being connected by a pin or bolt c. Through the bar D, a perforated bar E, also passes and is secured by a pin or bolt d, said bar E, also passing through a slot in a lever G, which is also perforated the bar E, being secured in the lever by a bolt e.

In the lever G, friction rollers f, f, are placed and if desired the bar D, may also be provided with friction rollers although none are shown in the drawing. The lever G, extends outward any desired length and it is provided near its end with a swivel tree in order that a horse or other draft animal may be attached thereto.

The implement is applied to the tree to be operated on as shown clearly in Fig. 2, the tree being shown in red, the attachment of the bars C, D, E, to each other and to the lever G, being regulated by fitting the bolts c, d, e, in the proper holes so that the device may be adjusted to suit the size of the tree. The animal being attached to the outer part of the lever G, the latter is made to revolve around the tree in the direction indicated by the arrow the operator having hold of the handle B. As the lever G, rotates the cutter A, penetrates the tree and is carried around, the draft applied to lever G, having a tendency to feed or draw the cutter inward to its work. The lever G, is rotated until the cutter has nearly reached the center of the tree, or until the tree begins to bend on the cutter at one side, indicating that it leans. The operator then releases the handle B, and the implement drops from the tree and the animal is started on until out of the way of the tree, when the work is finished with the axe. In girdling trees the implement when applied to medium sized trees could be worked exclusively by hand.

It will be seen from the description that the handle B, and lever G, when connected as shown operate on the principle of a "cant-hook", and it will also be seen that the connection between the lever G, and the handle B, may be modified in various ways and the same principle of action carried out. I therefore do not confine myself to the arrangement of the bars C, D, E, for connecting the handle B, and lever G.

I would remark that the friction rollers f, f, may have a screw thread on their periphery in order to have a tendency as the lever G, is rotated to elevate said lever and overcome the gravity of the same thereby preventing the dropping of the implement before the first cut is made around the tree. After the first cut is made around the tree the implement will sustain itself. The form of the cutter A may also be varied as circumstances may require. For girdling trees the gouge-form of cutter as shown would probably be preferable. For felling a V-shape would be the best.

Having thus described my invention what I claim as new and desire to secure by Letters Patent, is,

The employment or use of the handle B, provided with a cutter A, and connected to a draft lever G, by the bars C, D, E, or any equivalent means so as to operate substantially as and for the purpose set forth.

A. P. TORRENCE.

Witnesses:
A. M. EDDLEMAN,
T. A. SMITH.